United States Patent [19]

Lander

[11] Patent Number: 4,471,717

[45] Date of Patent: Sep. 18, 1984

[54] NON-WATER WETTABLE GRANULAR MATERIAL AND METHOD OF PREPARING AND USING SAME

[76] Inventor: Harry L. Lander, 2745 Birch Crest Dr., Grand Rapids, Mich. 49506

[21] Appl. No.: 561,731

[22] Filed: Dec. 15, 1983

Related U.S. Application Data

[63] Continuation-in-part of Ser. No. 295,740, Aug. 24, 1981, Pat. No. 4,444,148.

[51] Int. Cl.$^3$ .............................................. A01K 1/015
[52] U.S. Cl. ....................................................... 119/1
[58] Field of Search ............................................. 119/1

[56] References Cited

U.S. PATENT DOCUMENTS

| | | | |
|---|---|---|---|
| 4,038,944 | 8/1977 | Tucci | 119/1 |
| 4,163,674 | 8/1979 | Been | 119/1 X |
| 4,278,047 | 7/1981 | Luca | 119/1 |
| 4,326,481 | 4/1982 | Gruss | 119/1 |
| 4,409,925 | 10/1983 | Brundrett et al. | 119/1 |

*Primary Examiner*—Hugh R. Chamblee

[57] ABSTRACT

Hydrophobic substantially non-absorbent, substantially non-water wettable granular material suitable for use as a bedding for animals or for use as litter material in a waste receptacle for animals comprises particle-form granular material coated and/or impregnated with wax or paraffin or similar hydrophobic non-water wettable material and provided with an additional top coating or layer of a substantially non-water wettable material. A particularly useful material comprises granulated corn cob initially coated or impregnated with paraffin wax and subsequently coated or layered with a top coating or layer of a cured epoxy resin.

26 Claims, No Drawings

NON-WATER WETTABLE GRANULAR MATERIAL AND METHOD OF PREPARING AND USING SAME

This invention is a continuation in part of copending coassigned patent application Ser. No. 295,740, filed Aug. 24, 1981, now U.S. Pat. No. 4,444,148. The disclosures of the above-identified patent application are herein incorporated and made art of this disclosure.

BACKGROUND OF THE INVENTION

This invention relates to an improved hydrophobic, non-absorbent, substantially non-water wettable granular material suitable for use as a bedding material for animals, such as large animals, e.g. horses, and to receive or for use to receive waste of small animals such as cats, rabbits and mice.

Cages on waste receptacles for small animals, such as cats or laboratory animals usually employ absorbent materials, such as shredded paper or other absorbent granular litter or litter type materials, for receiving, and in particular, for absorbing liquid animal excrement. This litter material, however, becomes wetted or saturated with liquid waste and is a source of offensive odor, as well as a potential source of infection or sickness to the animals in contact therewith. Also, litter material must be changed fairly often when wetted or saturated with liquid animal waste.

Attempts have been made to replace, absorbent litter materials with non-absorbent litter materials. These materials have generally proven to be unsatisfactory. Although non-absorbent, and not necessarily offensive to humans, it has been found that these non-absorbent litter materials are obnoxious or repulsive to small animals. There are various reasons why small animals kept in cages find the non-absorbent litter material offensive, such as the odor, or residues of odor of these non-absorbent materials.

Hence, it is an object of this invention to provide an improved, granular material for use to receive small animal waste.

It is a further object of this invention to provide a method of producing improved granular materials useful to receive small animal waste or as a bedding material and the like for large animals.

How these and other objects of this invention are achieved will become apparent in light of the accompanying disclosure.

SUMMARY OF THE INVENTION

Particle form granular material is coated and/or impregnated with, e.g., wax or paraffin or a similar hydrophobic, non-water wettable material. Following said coating and/or impregnation, the particle form granular material is then provided with an additional top coating or layer of a substantially non-water wettable material.

The granular material employed for the production of the resulting hydrophobic, substantially nonabsorbent, non-water wettable granular material is desirably tough, resilient, and non-toxic, and when employed as litter material is acceptable to small animals.

DETAILED DESCRIPTION OF THE INVENTION

Particle form granular material is contacted with a hydrophobic, non-water wettable substance so as to coat and/or to impregnate the granular material with the hydrophobic, non-water, wettable substance. Various granular materials may be used, such as corn-cob granules, granulated wood, wood chips, sawdust or any inorganic or organic material which is resilient, and compressible. In a preferred embodiment of the invention, the particle form granular material is particle form corn cob granules. The corn cob granules are a preferred material because of various properties possessed therein. Corn cob granules are readily available and inexpensive, are tough, resilient, and do not fracture or break, and are non-toxic, especially to small animals. Additionally, corn cob granules are light and buoyant, and e.g., float on aqueous liquids, and their particle size is, on the average, ideal for use in foraminated trays used as litter pans.

Various non-water wettable, hydrophobic material may be employed to treat and/or to impregnate the granular materials employed as the particles of this invention. Some of the substances which may be used to coat and/or to impregnate the particle form granular material include wax, oil-based paint, silicone and polymeric material, preferably non-water wettable, among others. A preferred embodiment of the invention employs wax or paraffin as the non-water wettable, hydrophobic substance. Wax, or paraffin, is a preferred substance because of its ready availability, low cost, and non-toxicity. It also melts at a low enough temperature so as to allow it to coat and/or to impregnate granular material without damage to the granular material, and is retained on the coated granular particle material as a uniform coating thereon, over the temperatures at which the coated granular material is used.

The coated or impregnated particle material is then additionally coated with a top-coating of a substantially non-water wettable material. A preferred embodiment of the invention employs as the top coating a cured epoxy resin. Epoxy resin additionally provide toughness and durability to the granular material. Also, epoxy resins are widely available, at reasonable expense. Most epoxy resins cure fairly readily upon the addition of a curing agent, and provide a tough and substantially odor free animal acceptable top coating. The cured resins retain their stability over the range of temperatures at which the granular material is used, and do not substantially change the buoyancy of the particle material which they coat.

An additional advantage of using cured resins or resinous materials is that, prior to curing, various substances may be added to the resin, so as to impart a particularly desirable or useful property to the coated particle material. For example, it has long been known that those animals kept in stables or stalls, such as horses, cows, and the like, will often consume part of their bedding material. The bedding material is usually non-digestible and, if consumed, sometimes causes colic, a sometimes lethal condition. Colic is a problem with prized animals, such as breeding animals, and other valuable animals. By imparting a non-appealing aroma and/or taste to the granular material of this invention when employed as a bedding material, colic may be avoided. This is accomplished in accordance with the practices of this invention by adding to the resin or resinous material of the top coat, preferably prior to curing, a non-toxic, distasteful organoleptic agent, such as, e.g., cinnamaldehyde. The resulting granular material remains effective as a litter or bedding material, but is not consumed by animals, particularly large animals, e.g., horses, cattle, and the like. The following example sets forth one embodiment of the invention, but is not a limitation upon the invention as described herein.

EXAMPLE I

Thirty-eight to forty pounds of corn cob granules, having an average size of plus eight mesh, is charged into a screen container and submerged in a molten paraffin bath, the paraffin having a melting point of about 125° F. The wax bath is maintained at 300°-325° F., so as to raise the ambient temperature of the corn cob granules, so as to obtain a fast cure of the epoxy resin, when applied after the corn con granules have been coated and/or impregnated by the paraffin wax.

The hot, wax coated corn cob granules are then charged into a 3 cubic foot tumbler having a rotating speed of 20-23 RPM and, if desired, extender or filler materials, inorganic or organic, such as ground limestone, may be added at this stage. An admixture of approximately 2 quarts epoxy resin and 2 quarts epoxy curing agent is then added to the tumbling wax coated corn cob granules, and the resulting mixture is allowed to tumble for 25-35 minutes until a tack-free, free flowing coated granule product is obtained. The cured epoxy coated, wax coated corn cob granules are then removed from the tumbler and are stored at ambient temperatures for approximately 24 hours, so as to ensure a complete cure of the epoxy resin. If desired, particularly if the coated corn cob granule product is to be used as bedding material for large animals, such as horses, cattle and the like, there is added along with the epoxy resin a suitable non-toxic organoleptic agent such as cinnamaldehyde so as to make the coated corn cob granules distasteful to the animals, thereby discouraging the animals from eating the coated granules.

The resulting epoxy cured, wax-coated corn cob granules have a water absorbency of 0-0.15%, are free of any residual resin or curing agent odor, and do not present an odor which is repulsive to small animals such as cats, rabbits, mice, and the like.

The skilled artisan will recognize that the invention as disclosed herein has applications beyond those set forth hereinabove.

What is claimed is:

1. A method of preparing substantially hydrophobic, non-absorbent, non-water wettable granular material suitable for use as a bedding for animals or for use in waste receptacles for animals comprising admixing particle form granular material with a hydrophobic, non-water wettable material so as to coat and/or to impregnate said granular material with said hydrophobic, non-water wettable material as a base coating and additionally coating the resulting coated granular material with a substantially non-water wettable material as a top coating.

2. A method as in claim 1, wherein said hydrophobic, non-water wettable material base coating is wax or paraffin.

3. A method as in claim 1, wherein said top coating is a cured epoxy resin.

4. A method as in claim 1, wherein said hydrophobic, non-water wettable material as said base coating is selected from the group comprising wax, oil base paint, silicone, and polymeric material.

5. A method as in claim 1 wherein said granular material is corn-cob granules.

6. A method as in claim 1, wherein said granular material is resilient, compressible, organic or inorganic material.

7. A method as in claim 1, wherein said granular material is granulated wood, wood chips or sawdust.

8. A method as in claim 1, wherein said granular material has an inorganic or organic filler added thereto.

9. A method as in claim 8, wherein said filler is ground limestone.

10. A method of preparing granular material as in claim 1, said granular material having added thereto a distasteful non-toxic organoteptic agent, said organoleptic agent being added to said granular material in amounts sufficient to render said granular material distasteful for the animals to eat.

11. A method as in claim 10, wherein said organoleptic agent is cinnamaldehyde.

12. Hydrophobic, substantially non-absorbent, non-water wettable granular material as in claim 11 wherein said particle form granular material is wood or cellulosic material such as granulated wood, wood chips or sawdust.

13. Hydrophobic, substantially non-absorbent, non-water wettable granular material as in claim 11, wherein said granular material has an inorganic or organic filler added thereto.

14. Hydrophobic, substantially non-absorbent non-water wettable granular material as in claim 13, wherein said filler is ground limestone.

15. Hydrophobic, substantially non-absorbent, non-water wettable granular material suitable for use as a bedding for animals or for use in waste receptacles for animals comprising substantially freeflowing particle form granular material coated and/or impregnated with hydrophobic, non-water wettable material as a base coating and provided with an additional top coating or layer of a substantially non-water wettable material.

16. Hydrophobic, substantially non-absorbent, non-water wettable granular material as in claim 13, wherein said hydrophobic non-water wettable material as said base coating is wax or paraffin.

17. Hydrophobic, substantially non-absorbent non-water wettable granular material as in claim 15, wherein said substantially non-water wettable material as said base coating is cured epoxy resin.

18. Hydrophobic, substantially non-absorbent non-water wettable granular material as in claim 15, wherein said particle form granular material is corn cob granules.

19. Hydrophobic, substantially non-absorbent non-water wettable granular material as in claim 15, wherein said hydrophobic, non-water wettable material as said base coating is selected from the group comprising wax, oil-based paint, silicone and polymeric material.

20. Hydrophobic, substantially non-absorbent non-water wettable granular material as in claim 15, wherein said particle form granular material is resilient, compressible, organic or inorganic material.

21. Hydrophobic, substantially non-absorbent, non-water wettable granular material as in claim 15, said granular material having added thereto a distasteful m non-toxic organoleptic agent, said organoleptic agent being added to said granular material in amounts sufficient to render said granular material distasteful to animals for eating.

22. Hydrophobic, substantially non-absorbent, non-water wettable granular material as in claim 15, wherein said organoleptic agent is cinnamaldehyde.

23. A method of providing for the maintenance of animals in stalls and stables comprising providing in said stalls and stables as a bedding a layer comprising substantially hydrophobic, non-absorbent, non-water wettable granular material in accordance with claim 13, said granular material having added thereto a distasteful non-toxic organoleptic agent, said organoleptic agent being added to said granular material in amounts sufficient to render said granular material distasteful to animals for eating.

24. A method as in claim 23, wherein said organoleptic agent is cinnamaldehyde.

25. Hydrophobic substantially non-absorbent, non-water wettable granular material suitable for use as bedding material for animals kept in stalls, and stables comprising particle form corn cob granular material coated and/or impregnated with a hydrophobic, non-water wettable material and provided with an additional coating or layer of a substantially non-water wettable material having added thereto a distasteful non-toxic organoleptic agent, said organoleptic agent being added in amounts sufficient to render said particle form granular material distasteful to animals for eating.

26. A hydrophobic, substantially non-absorbent, non-water wettable granular material as in claim 25, wherein said organoleptic agent is cinnamaldehyde.

* * * * *